United States Patent
Vice

(10) Patent No.: US 7,256,638 B2
(45) Date of Patent: Aug. 14, 2007

(54) SERIES ACTIVE FILTERING POWER LINE CONDITIONER

(76) Inventor: Michael Wendell Vice, P.O. Box 1117, El Granada, CA (US) 94018

( * ) Notice: Subject to any disclaimer, the term of this patent is extended or adjusted under 35 U.S.C. 154(b) by 0 days.

(21) Appl. No.: 10/072,676

(22) Filed: Feb. 7, 2002

(65) Prior Publication Data

US 2002/0105233 A1 Aug. 8, 2002

Related U.S. Application Data

(60) Provisional application No. 60/267,399, filed on Feb. 7, 2001.

(51) Int. Cl.
*G05F 3/02* (2006.01)
(52) U.S. Cl. ........................ 327/531; 327/110
(58) Field of Classification Search ................ 327/304, 327/309, 312, 317, 323, 540, 110, 531; 363/20, 363/21.09
See application file for complete search history.

(56) References Cited

U.S. PATENT DOCUMENTS

| | | | | |
|---|---|---|---|---|
| 3,906,301 | A * | 9/1975 | Fisher | 315/97 |
| 4,511,763 | A * | 4/1985 | Skidanenko et al. | 379/413 |
| 5,013,931 | A * | 5/1991 | Estes, Jr. | 327/140 |
| 5,754,414 | A * | 5/1998 | Hanington | 363/21.12 |
| 6,434,023 | B2 * | 8/2002 | Preller | 363/21.04 |

OTHER PUBLICATIONS

"*Clean Power Supply PS-1200.*" Accuphase PS-1200—Apr. 15, 2002, pp. 1-5, http://www.accuphase.com/ps-1200_es.htm.

* cited by examiner

*Primary Examiner*—Terry D. Cunningham

(57) ABSTRACT

The apparatus includes a series active continuous time voltage regulator operating in conjunction with a alternating current power source and one or more loads. The alternating current power source is a voltage source that induces currents at a first end of the apparatus. At a second end of the apparatus one or more loads consume power from the apparatus. The series buck-boost regulator is composed of a pure monochromatic voltage source of frequency equal to that of the alternating current power source, and of constant phase with respect to the alternating current power source. The regulator is further composed of a sampling network that provides a scaled continuous time sample of the voltage delivered by the power conditioner to the loads. Finally, the regulator is composed of a high gain differential amplifier. The components of the regulator are configured to operate as a continuous time feedback control system that generates an error correction voltage that, when added to the voltage of the alternating current power source, results in an output voltage from the power conditioner that is a scaled replica of the monochromatic reference voltage. As a result, the voltage delivered by the power conditioner to the loads is substantially corrected of spectral impurities and impervious to the specific conditions of the alternating current power source or of the loads.

25 Claims, 20 Drawing Sheets

SERIES ACTIVE FILTERING POWER LINE CONDITIONER

CROSS REFERENCE TO RELATED APPLICATIONS

This application is a continuation of co-pending U.S. Ser. No. 60/267,399, filed on Feb. 7, 2001. The priority of the prior application is expressly claimed and its disclosure is hereby incorporated by reference in its entirety.

FIELD OF THE INVENTION

This invention relates generally to power conditioners and methods which operate in the presence of unconditioned alternating current power, and more particularly to series active regulators used as active filters. These systems act to remove spectral impurities from the alternating current power line so as to provide power that is substantially sinusoidal and devoid of harmonic, spurious and random noise components.

BACKGROUND OF THE INVENTION

Power conditioning circuits are used to remove unwanted voltages and currents from alternating current voltage sources intended for supplying operating power to electronic equipment. Power conditioning sometimes refers to surge and spike protection. Another example of power conditioning pertains to removal of unwanted spectral components that may be of small amplitude with respect to the fundamental voltage of the power source. Specifically, power conditioning may refer to removal of spectral components either introduced by the power source or generated by the loads. Finally, power conditioning sometimes refers to regulation of the average amplitude of the power source voltage.

A series regulator is an apparatus that acts to control the voltage at some node in a network by adding a correction voltage to an existing voltage so that the sum of the voltages is controlled. A source of correction (or error correction) voltage is connected in series with an existing source of voltage. The correction voltage either acts to buck or to boost the existing voltage so that the discrepancy between the existing voltage and the desired voltage is removed. Voltage "bucking" is the addition of a opposite polarity voltage to an existing voltage, the result of which is a new voltage that has reduced magnitude with respect to the existing voltage. Voltage "boosting" is the addition of a same polarity voltage to an existing voltage, the result of which is a new voltage that has increased magnitude with respect to the existing voltage.

A feedback control system is a type of system that actively minimizes the error formulated as the difference between its desired behavior and its actual behavior. A feedback control system makes continuous comparison between the actual behavior of a system and a standard of desired behavior. From this comparison, a correction influence is derived that acts on the system to null the error.

An inverter is an apparatus that converts DC voltage into AC voltage. It may also be configured to first convert AC voltage into DC voltage, and second to convert DC voltage back into AC voltage. Inverters are frequently used in power conditioning and power control circuits to perform corrective operations on the incoming AC power.

A growing number of nonlinear loads in the electric utility power network has resulted in increasing waveform distortion of both voltages and currents in ac power distribution systems. Typical nonlinear loads are computer controlled data processing equipment, numerical controlled machines, variable speed motor drives, robotics, medical and communication equipment.

Utilities provide sinusoidal supply voltages. Nonlinear loads draw square wave or pulse-like discontinuous currents instead of the purely sinusoidal currents drawn by conventional linear loads. As a result, nonlinear current flows through the predominantly inductive source impedance of the electric supply network. Consequently, a non-linear load causes load current harmonics and reactive power to flow back into the power source. This results in unacceptable voltage harmonics and supply load interaction in the electric power distribution network.

The degree of current or voltage distortion can be expressed in terms of the magnitudes of harmonics in the waveforms relative to the fundamental magnitude. Total Harmonic Distortion (THD) is one of the accepted standards for measuring voltage or current quality in the electric power industry.

Aside from the waveform distortion, another imperfection common to utility electric power is the presence of spurious and random noise. Various electric appliances such as electric motors, radio and television receivers, and digital electronic computers and related appliances generate noise components that are non-harmonically related to the fundamental power line frequency. Finite isolation between the appliances and the public utility power grid results in spurious and random noise energy components traveling along the power grid. Further, electromagnetic radiation containing a wide variety of spectral components as well as broad spectrum noise couples into the power grid and propagates to the end user load equipment.

A wide variety of electrically powered appliances such as comprises home entertainment audio and video systems, test and measurement systems, hospital monitoring equipment, and computer systems have degraded operating performance when powered by AC power that contains typical levels of harmonic, spurious, and random noise components.

Another problem related to the nature of utility AC power pertains to the finite impedance of the AC power source as it appears at the load. When a number of separate pieces of electrical equipment are connected to the same AC power source there is a finite degree of coupling between the components at the point of common connection to the power source. The noise that each component generates and that leaks over to the AC input is allowed to enter each of the other components in the system. In this way each part of the system operates to degrade the performance of the remaining components. The AC power source offers only partial isolation between components because it has a finite source impedance at the point of common connection to the loads. An example of this is digital clock noise generated by a digital to analog converter in an audio playback system coupling through the power line connections and degrading the performance of a preamplifier in the same system.

Finite source impedance also inhibits the performance of electrical equipment by allowing the AC voltage sinewave to sag during high current transients. This results in higher levels of power supply ripple and compromised performance. An example can be seen in an audio amplifier application, where signal transients require high levels of current with sustained power supply voltage. In this case the finite power line impedance results in temporary collapsing of the AC sinewave voltage and a resulting distortion from the amplifier.

The unbalanced configuration of single phase AC power introduces additional problems for sensitive electronic equipment. There is significant radiation and coupling of AC power energy into downstream circuitry because the fields associated with unbalanced power are far reaching. In addition, the AC return current path utilizes the neutral line, which is eventually tied to earth ground. Since earth ground is the common node for each component in a system a certain degree of AC noise injection into the rest of the system is made possible by terminating the AC current path to this node.

A number of techniques have been used in an attempt to provide power line conditioning to address some of the foregoing problematic conditions. Passive filters, such as LC tuned filters, are often used because they are efficient and inexpensive. There are, however, a number of problems associated with passive filters. Practical constraints of size and cost limit passive filters to relatively simple topologies using relatively few components. The result is only a moderate suppression of AC power imperfections. In addition, the tuned resonators in passive filters have non-ideal behavior at frequencies other than the power line frequency. This manifests itself as undesirably high source impedance and results in poor current on demand characteristics and poor inter-component isolation.

Active power filters have been developed to resolve some of the problems associated with passive filters. Active power filters, or active power line conditioners (APLCs), inject signals into an ac system to cancel harmonics.

Active filters comprise one or two pulse width modulated inverters in a series, parallel, or series-parallel configuration (with respect to the load or supply). The inverters have a dc link, which can be a dc inductor (current link) or a dc capacitor (voltage link). It is necessary to keep the energy stored in the dc link (capacitor voltage or inductor current) at an essentially constant value. The voltage on the dc link capacitor can be regulated by injecting a small amount of real power into the dc link. The injected real power compensates for the switching and conduction losses inside the APLC.

One problem associated with active filters is that it is expensive and complicated to generate a reference signal for the feedback control that is sufficiently monochromatic and free of noise, and also phase locked to the incoming AC power. Customarily the digital clocks and phase detectors used to synchronize a free running oscillator to the AC line voltage generate considerable noise. The low loop bandwidth required for operation at power line frequencies results in inordinately long settling times and poor transient response.

Another problem with active filters is that of stability. The feedback control loop acting to monitor and correct error in the output signal with respect to the reference is typically band limited to prevent oscillation of the loop. The spectral purity and desirably low output impedance of the output power is limited to the bandwidth of the loop.

Alternatively, the AC power can be completely regenerated from a DC power supply operating from the AC power line. In this approach a pure sinewave source is amplified to the line voltage level by class A-B amplifiers. This approach suffers from very low efficiency, theoretically not to exceed 50%, and usually much lower values are realized due to practical circumstances. In addition, the source oscillator is typically derived from a digitally sampled sinewave and is corrupted by quantization impurities when reconstructed.

SUMMARY OF THE INVENTION

A power line conditioner operated in a method according to the present invention utilizes a series buck-boost voltage regulator as a filter for removing unwanted impurities from a source of alternating current power. The preferred embodiment of the apparatus includes a transformer and an active filter coupled in series to a power distribution network. The power distribution network includes a voltage source that induces input currents at a first end of the power distribution network. Nonlinear loads and other conditions on the power distribution network cause harmonic, spurious, and random noise components to corrupt the power signals. The active filter of the invention uses a monochromatic reference derived from the incoming AC power voltage which is prepared by stripping off unwanted harmonics and noise and regulating amplitude to a predetermined value. A feedback control system is configured to operate in series with a secondary winding of the transformer so as to effectively subtract voltage imperfections from the incoming AC. The control loop is compensated in such a way that it is stabilized without compromising bandwidth.

BRIEF DESCRIPTION OF THE DRAWINGS

For a better understanding of the nature and advantages of the invention, reference should be made to the following detailed description taken in conjunction with the accompanying drawings, in which.

DETAILED DESCRIPTION OF THE INVENTION

Figure 1:
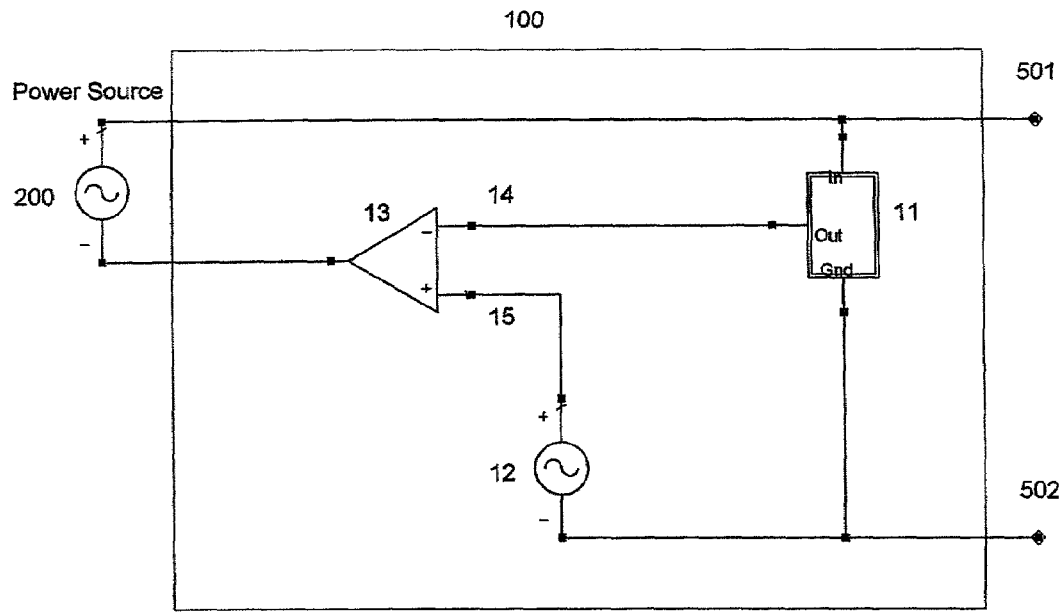
FIGS. 1–2 depict an embodiment of the feedback control loop of the present invention operating with an external power source.

In the description that follows, like reference numerals refer to corresponding parts throughout the several views of the drawings.

FIG. 1 depicts elements associated with an embodiment of the present invention. In general, the invention is directed to a series configured error correction feedback control system 100 which operates with other familiar components and a source of alternating current power 200. The feedback control system 100 is composed of sampler 11, voltage reference 12, and amplifier 13. All voltages describing the behavior of control system 100 are taken with respect to output 502, which is typically tied to system ground. It is a general characteristic of the invention that sampled voltage is compared with a reference voltage by an amplifier. It is a further characteristic of the invention that the sampled voltage appears at an input of an amplifier as negative feedback, whereby the amplifier acts in series with an alternating current power source to provide an output voltage as a scaled but otherwise substantially identical voltage to the reference voltage. An advantage of this embodiment of the system is to provide harmonic, spurious, and random noise isolation between source and load over a multi-decade frequency range (e.g., 100 Hz to 100 Khz). Another advantage of this embodiment of the system is to provide fractional ohm source impedance (e.g., 0.01 ohm to 0.1 ohm) to the load over a multi-decade frequency range.

It is ordinarily desirable that the reference voltage 15 be a pure sinewave. It is likewise ordinarily deemed desirable that the voltage output 501 of the power conditioner be as nearly perfect a sinewave as possible because the power supplies in electronic equipment are not well suited to remove broad band spectral impurities. Should something other than a perfect sinewave be desired for special purposes, the reference voltage 15 of voltage reference 12 must be correspondingly non-sinusoidal.

It is the normal operation of feedback control loop 100 that the sample voltage 14 is compared by amplifier 13 to the reference voltage 15, so as to form an error correction voltage at the output of amplifier 13. This is better depicted by FIG. 2. For convenience the sample voltage 14 of FIG. 1 is referred to as Vsam in FIG. 2, and the reference voltage 15 of FIG. 1 is referred to as Vref in FIG. 2. Amplifier 13 can be any type of amplifier circuit and is shown in idealized form. Amplifier 13 is characterized by a voltage gain Ava. Sampler 11 is characterized by a voltage gain Avs, typically less than unity. Voltage reference 12 produces a voltage Vref at the non-inverting input of amplifier 13. Sampler 11 produces a voltage Vsam at the inverting input of amplifier 13. The voltages Vref, Vsam, Verrcor, and Vout are taken with respect to node 17. These inputs are marked "+" and "−," respectively. The response of amplifier 13 is to produce an output error correction voltage Verrcor:

$$Verrcor = Av^*(Vref - Vsam) \quad \text{Equation 1}$$

Figure 2:
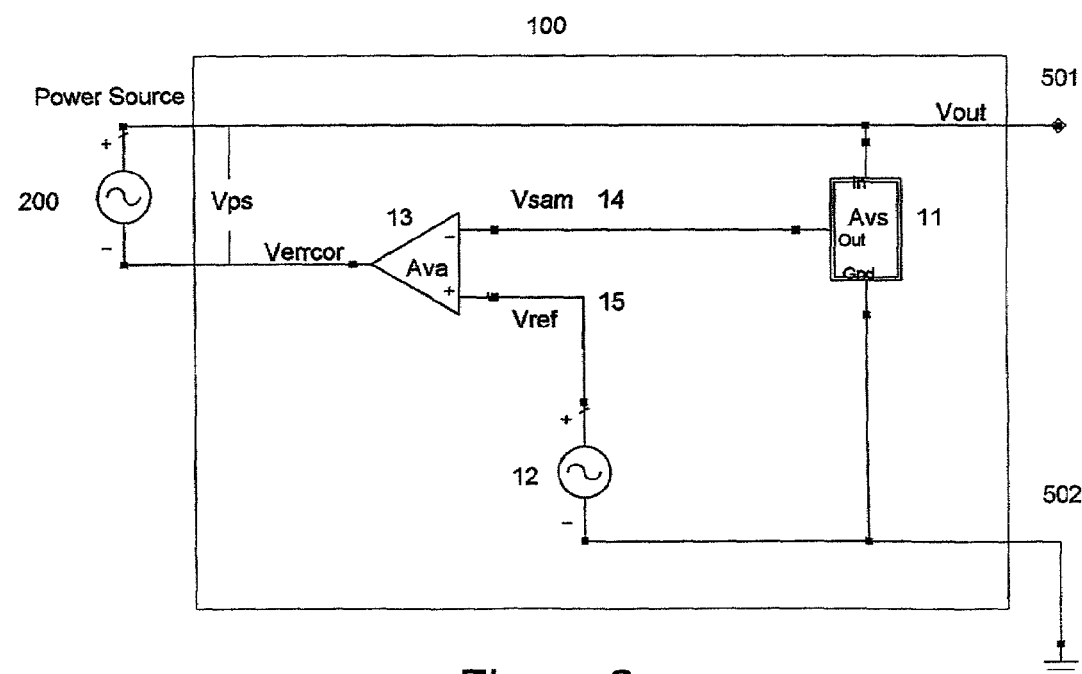

It can be seen from equation 1 that the greater the difference between the reference voltage and the sample voltage, the greater the output error correction voltage generated by the amplifier. FIG. 2 also shows the voltage Vps of the power source and the voltage Vout of the output 17. By direct substitution:

$$Vout = Vps + Verrcor \quad \text{Equation 2}$$

$$Vsam = Avs^* Vout \quad \text{Equation 3}$$

$$Vout = Vps + Ava^*(Vref - Avs^* Vout) \quad \text{Equation 4}$$

Solving for Vout yields:

$$Vout = (Vps + Ava^* Vref)/(1 + Ava^* Avs) \quad \text{Equation 5}$$

If the amplifier gain is high such that:

Inequality 1: $Ava^* Vref \gg Vps$

Inequality 2: $Ava^* Avs \gg 1$ then Vout may be approximated by:

$$Vout \approx (1/Avs)^* Vref \quad \text{Equation 6}$$

It can be seen that a requirement for the feedback loop to provide Vout as a scaled replica of the Vref is that the amplifier gain be high according to Inequalities 1 and 2. It can also be seen that the reciprocal of the sampler gain Avs is the scale factor between Vout and Vref, according to Equation 6.

In one preferred embodiment of the present invention the values discussed above are as follows:

$Ava \approx 100{,}000$ $Avs = 0.033$ $Vref \approx 0.033^* Vps$

Substituting these values into Inequality 1 gives:

$(100{,}000)^*(0.033^* Vps) \gg Vps$ $3{,}300 \gg 1$

It can be seen that this preferred embodiment meets the requirement for amplifier gain. The intent of the present invention is best served where the product of amplifier gain and sampler gain is at least 10.

Figure 3:
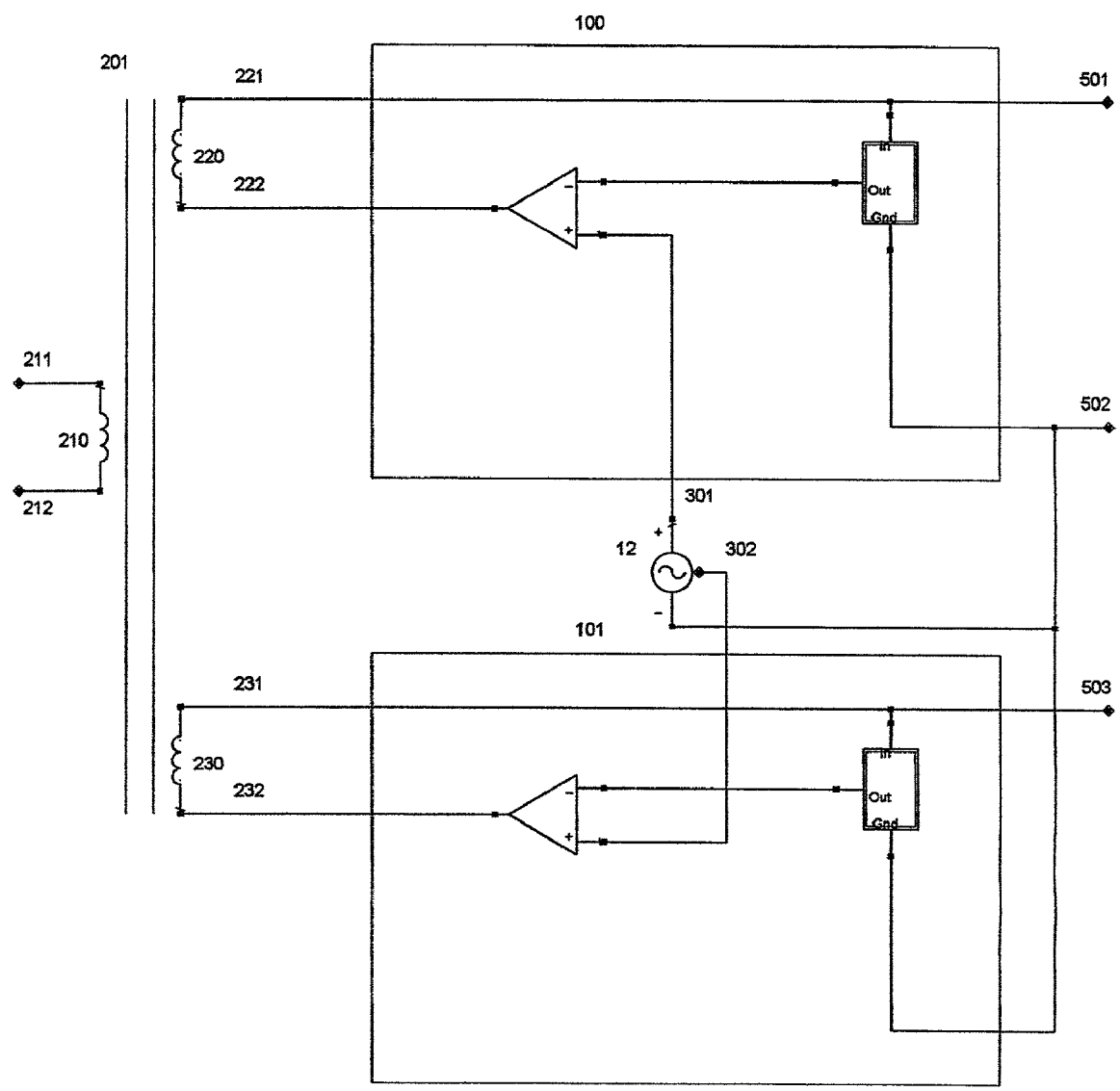
FIG. 3 depicts an embodiment of a pair of feedback control loops operating with an isolation transformer to form a balanced output power conditioner.

FIG. 3 shows a combination of two feedback loops 100 and 101, where the power source 200 of FIGS. 1–2 is replaced by a transformer 201 that receives power into a primary winding 210 from an external power source. The entire circuit forms an embodiment of a balanced power conditioner of the present invention. It is composed of an isolation transformer 201 having a primary winding 210 and two identical secondary windings 220 and 230. Secondary winding 220 has terminals 221 and 222, so that the voltage at terminal 221 relative to the voltage at terminal 222 is in phase with the voltage at terminal 211 of primary winding 210 relative to the voltage at terminal 212. Secondary winding 230 has terminals 231 and 232, so that the voltage at terminal 231 relative to the voltage at terminal 232 is out of phase with the voltage at terminal 211 of primary winding 210 relative to the voltage at terminal 212.

A first feedback control loop 100 is tied to secondary 220 and a second loop 101 is tied to secondary 230 to form the power conditioner. A single voltage reference 12 supplies a reference voltage for both feedback loops. More exactly, voltage reference 12 has output 301 which is in phase with the voltage at terminal 221 of secondary winding 220 relative to the voltage at terminal 222. Voltage reference 12 also has output 302 which is in phase with the voltage at terminal 231 of secondary winding 230 relative to the voltage at terminal 232. The voltage at output 301 is 180 degrees out of phase with the voltage at output 302. Feedback control loop 100 provides output 501 of the power conditioner, while loop 101 provides output 503 of the power conditioner. Both loops are grounded to output 502 of the power conditioner, which forms the ground of the output balanced power. The power conditioner of FIG. 3 provides balanced power from either a balanced AC power line or an unbalanced AC power line. The turns ratio of transformer 201 is not specific to the invention and can be determined to provide voltage step up or voltage step down, as well as one-to-one voltage transformation. For example, in one embodiment of the system the turns ratio is one turn of secondary windings 220 and 230 per two turns of primary winding 210. Additional secondary windings may be added to transformer 201 to provide auxiliary power to the system, such as power for operating the amplifier and reference circuits.

Figure 4:
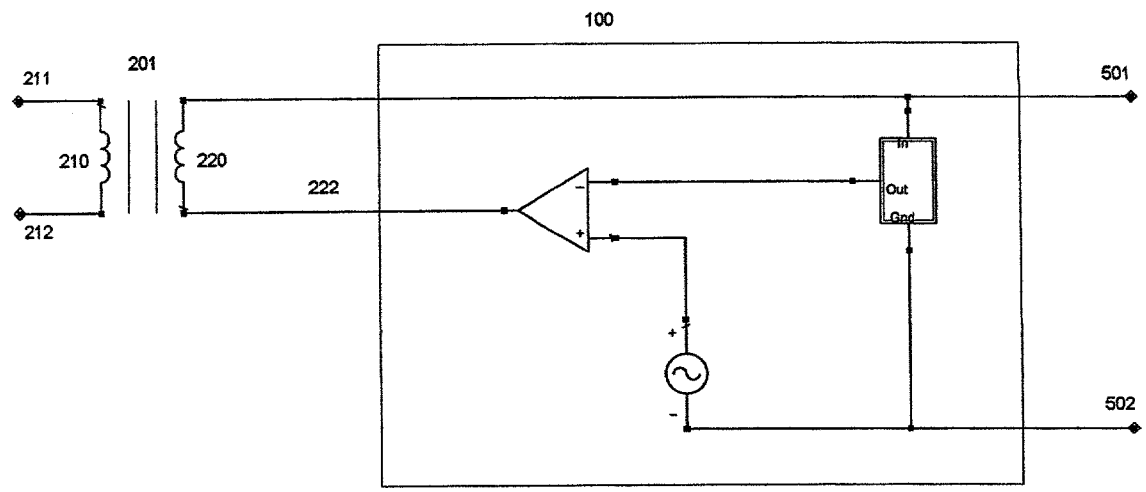
FIG. 4 represents an embodiment of a single feedback control loop operating with an isolation transformer to form an unbalanced output power conditioner.

FIG. 4 shows an alternate configuration of the present invention, wherein a two wire output is provided. This type of output is normally referred to as unbalanced because the ground of the load network is normally connected to either one of output 501 or output 502. A transformer 201 having a primary winding 210 and a secondary winding 220 couples the power source main voltage between Input 211 and Input 212 to the servo 100.

The use of a transformer in the circuits of FIG. 3 and FIG. 4 provides a means of summing the error correction voltage and power source main voltage.

Figure 5:
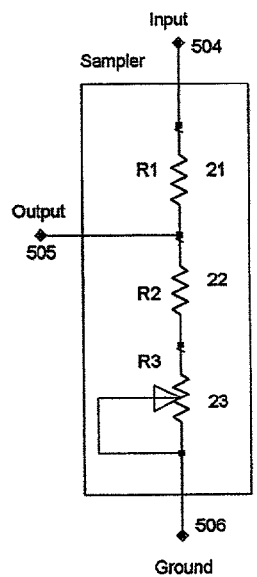
FIG. 5 illustrates an embodiment of a voltage sampler of the present invention.

FIG. 5 shows the schematic diagram for the sampler of the preferred embodiment, having an input port 504, an output port 505, and a ground port 506. It can be seen to be a simple voltage divider. The purpose of the sampler is to provide a scaled replica of the output voltage of similar magnitude to that of the voltage reference. The sampler of FIG. 5 is shown to have adjustable gain by variable resister 23, as a means of adjusting the output voltage of the power conditioner. The voltage gain Avs of the sampler is given below:

$$Avs=(R2+R3)/(R1+R2+R3) \quad \text{Equation 7}$$

It should be appreciated that a variety of sampling circuit topologies exist that are suitable to providing the scaled sampling function, and that simple voltage dividers may take the form of capacitive networks. Further, an active network could be used in this capacity. In general, the sampler may also provide an arbitrary phase shift or other phase characteristic to the sampled voltage. It is also recognized that the sampler could provide a current output to the amplifier, instead of a voltage. The type of output required from the sampler by the amplifier depends on the amplifier input requirement. If the amplifier is a trans-voltage amplifier then a voltage output is required of the sampler. If the amplifier is a trans-impedence amplifier then a current output is required of the sampler.

Figure 6:
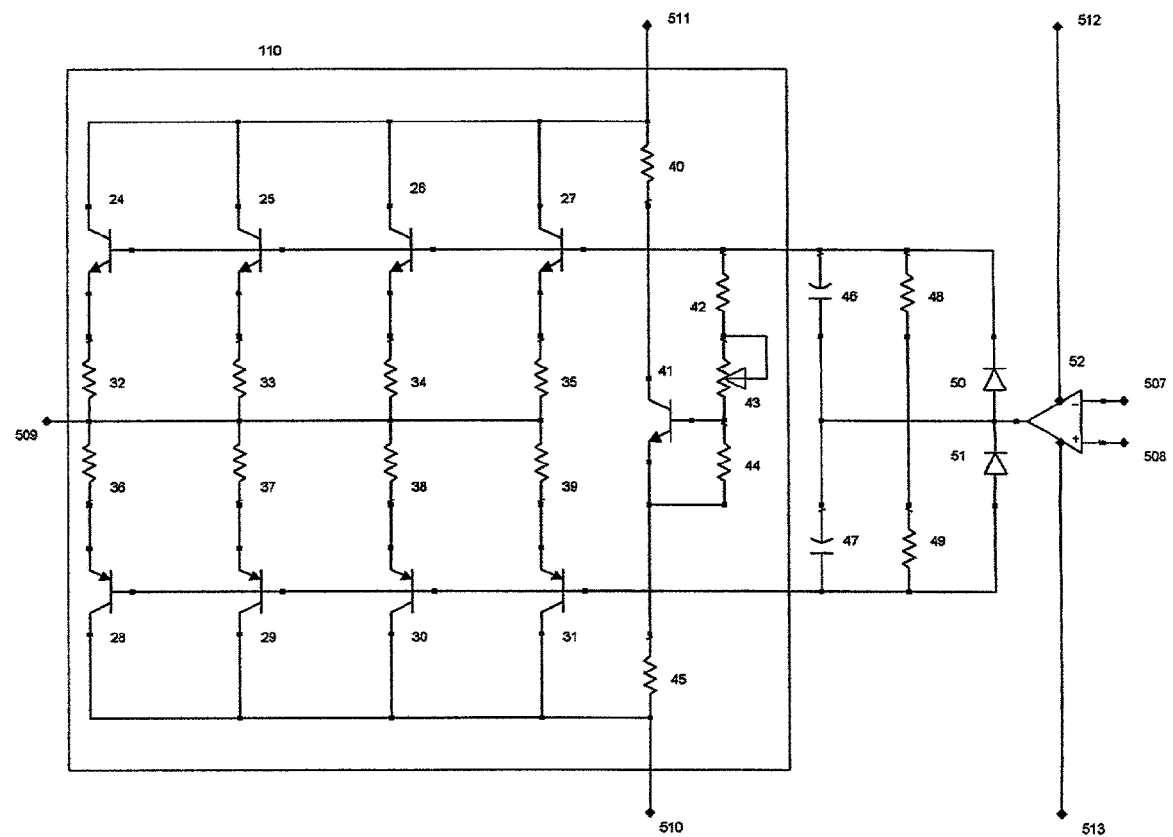
FIG. 6 depict a first embodiment of the amplifiers of the present invention.

FIG. 6 depicts an embodiment of the amplifier of the preferred embodiment. It can be seen to be a differential amplifier having an inverting input 507 and a non-inverting input 508, and a single high current output 509. In the preferred embodiment an integrated circuit operational amplifier (OpAmp) 52 is followed by a push-pull high current output stage 110. The integrated amplifier is preferably of the type suitable as a self contained high power audio amplifier capable of delivering around 50 watts of power into an 8 ohm load, such as the National Semiconductor LM3875. The plus supply 512 and the minus supply 513 voltages (voltage rails) of the OpAmp should desireably be at least as large as the maximum anticipated error in the incoming AC sinewave. The preferred embodiment for 117 VAC line voltage applications provides +28 volts and −28 volts to the OpAmp at 512 and 513, respectively. The preferred embodiment also provides voltage rails of +18 volts and −18 volts to output stage voltage rails 511 and 510, respectively.

FIG. 6 shows an embodiment of the output stage 110 as consisting of four PNP transistors, 24–27, and four NPN transistors, 28–31, wired to form a complementary push-pull amplifier. Emitter resistors 32–39 serve to stabilize the bias and promote equitable sharing of bias current over temperature changes. The output stage 110 is base biased by resistors 40 and 45, and unneeded current is bypassed by transistor 41 and resistors 42–44. Optional to the circut, the bias control circuit comprised of transistor 41 and its associated resisters 42–44 form a standard temperature compensated bias network common to the art. Resistor 43 is adjustable to permit trimming of the operating point current in the output transistors. The output of OpAmp 52 is coupled to the output stage 110 through a network consisting of capacitors 46 and 47, resistors 48 and 49, and diodes 50 and 51, as can be seen in FIG. 6. The amplifier of FIG. 6 is suitable for 15 amperes of output current.

Figure 7:
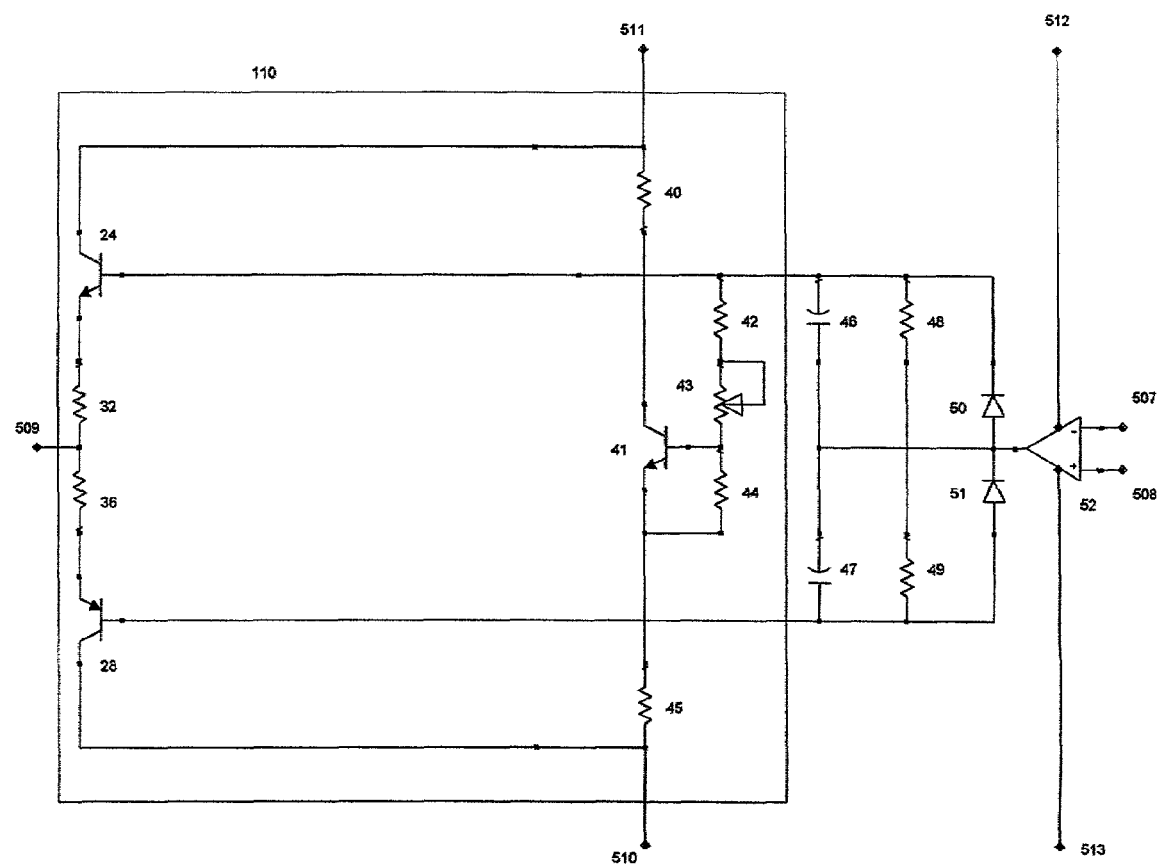
FIG. 7 depicts a second embodiment of the amplifiers of the present invention.

FIG. 7 shows an alternate topology for the amplifier, suitable for lower current applications in the range of 3–5 amperes. In this embodiment the amplifier 110 consists of only a single branch of transistors 24 and 28, and their associated bias circuitry. The applications include power supplies for large television receivers and other medium current component electronics.

Figure 8:
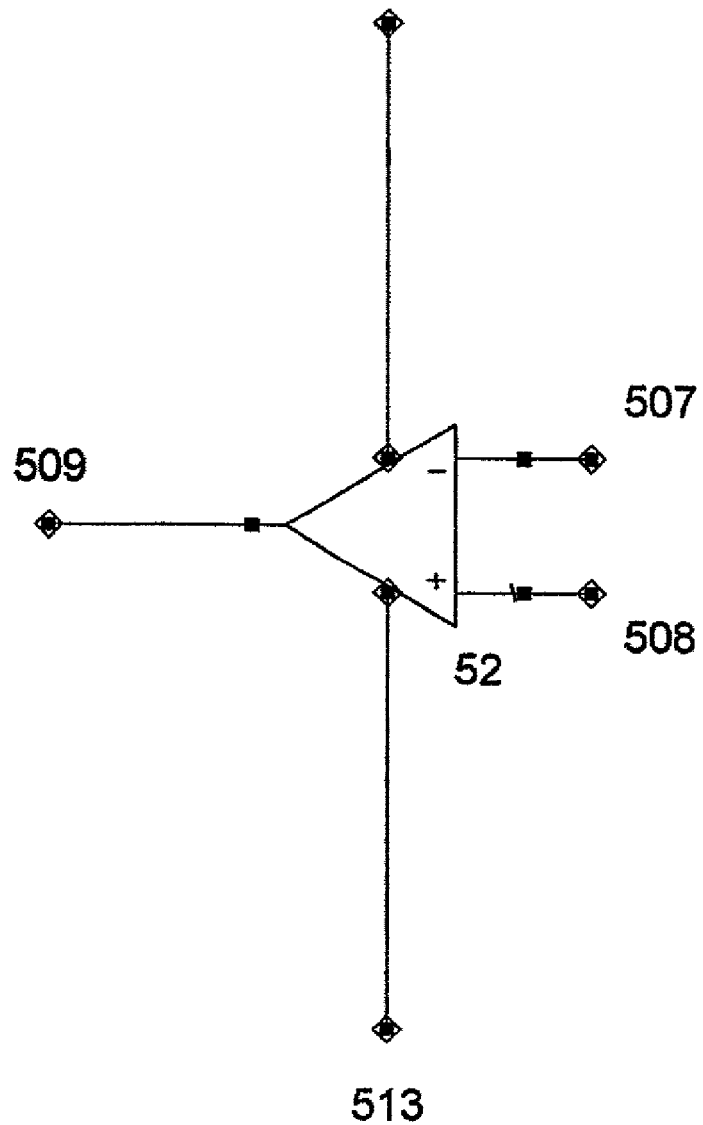
FIG. 8 depicts a third embodiment of the amplifiers of the present invention.

FIG. 8 shows the amplifier as consisting of only OpAmp 52. The amplifier of FIG. 8 is appropriate when only 1–2 amperes of output current is required. An advantage of this embodiment of the amplifier is to provide a series active power line conditioner that can be integrated into a single function self contained apparatus such as a compact disc player.

Figure 9:
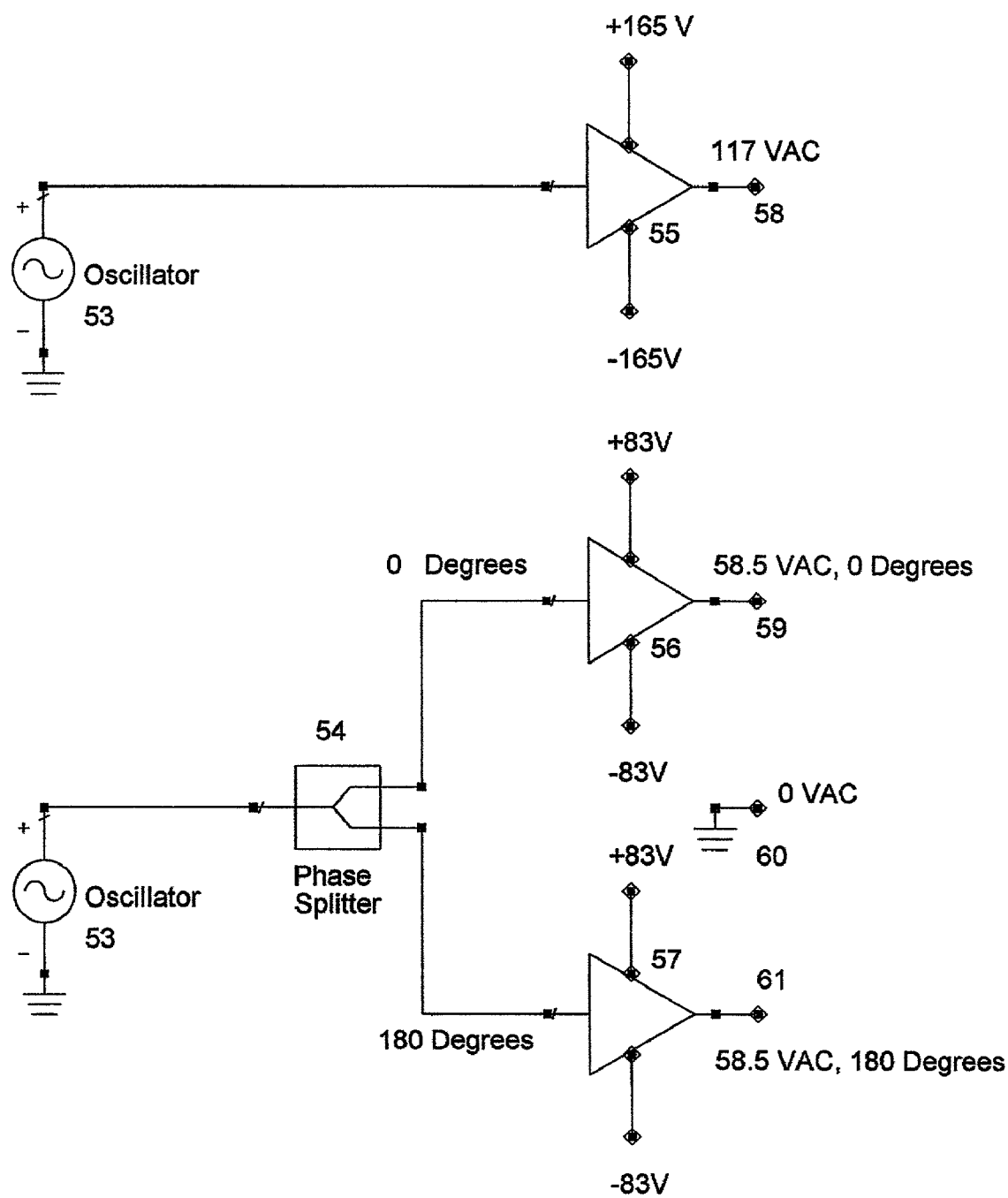
FIG. 9 illustrates an embodiment of a conventional power regeneration system.

In each case the voltage rails for the amplifier are small compared to the magnitude of output AC voltage of the power conditioner, this made possible by the fact that only the relatively small error correction voltage is generated by the amplifier. This stands in contradistinction to the power regenerative schemes of the prior art, wherein the amplifier must generate the entire AC output voltage of the power conditioner, as in the embodiments of FIG. 9. For this reason there is a considerable improvement in efficiency compared with power regenerative systems. The efficiency of the preferred embodiment of the present invention is about 75%.

Figure 10:
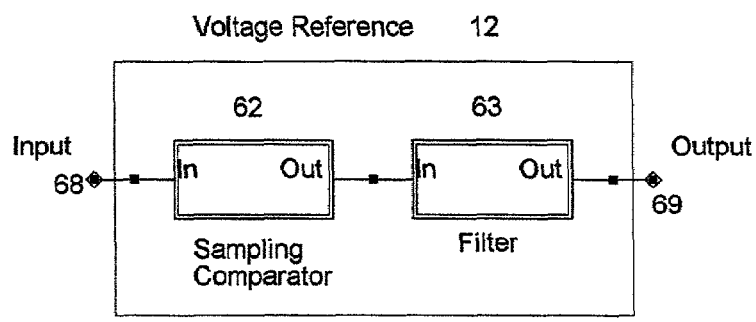
FIG. 10 depicts an exemplary voltage reference according to one embodiment of the present invention.
Figure 11:
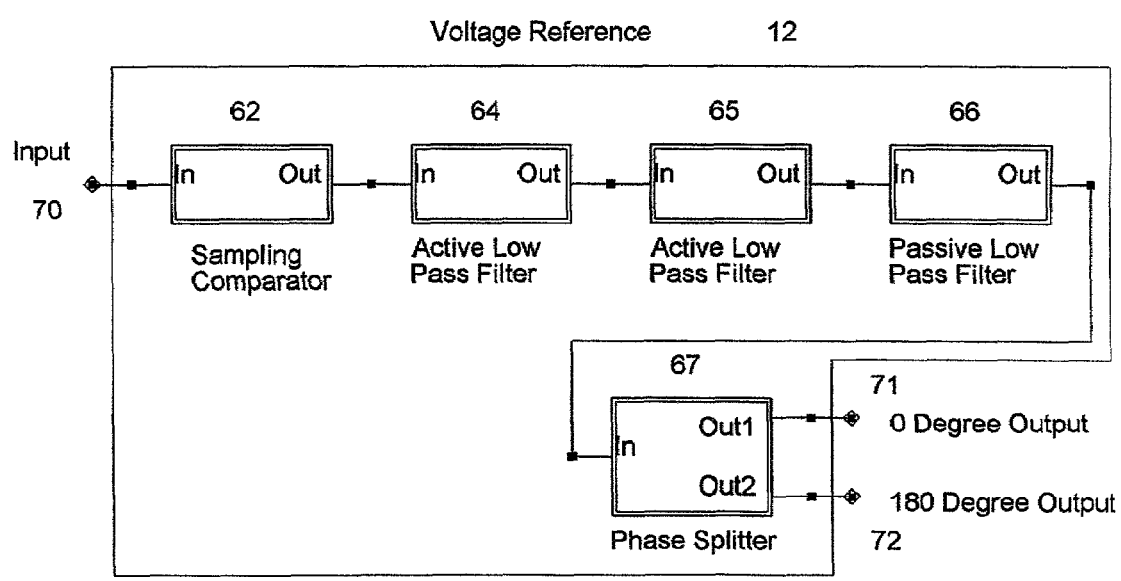
FIG. 11 depicts an exemplary voltage reference according to a second embodiment of the present invention.

The voltage reference in the embodiment is derived from the pre-conditioned AC power by sampling and filtering. This differs from the prior art in that no oscillator and phase locked loop is required to ensure a reference voltage that is phase coherent to the incoming AC power. FIG. 10 shows an embodiment in which the voltage reference is a sampling comparator 62, followed by a filter 63. FIG. 11 shows a block diagram of a system for generating a voltage reference of the preferred embodiment. The reference 12 is composed of sampling comparator 62, active low pass filters 64 and 65, passive low pass filter 66, and phase splitter 67. The phase splitter is used when balanced power output is generated from the power conditioner. The active low pass filters of the preferred embodiment are configured as 8th order low pass filters. Other types of low pass filters may be used, such as 2nd order or higher order low pass filters. Alteratively, bandpass filters may be used instead of low pass filters.

Figure 12:
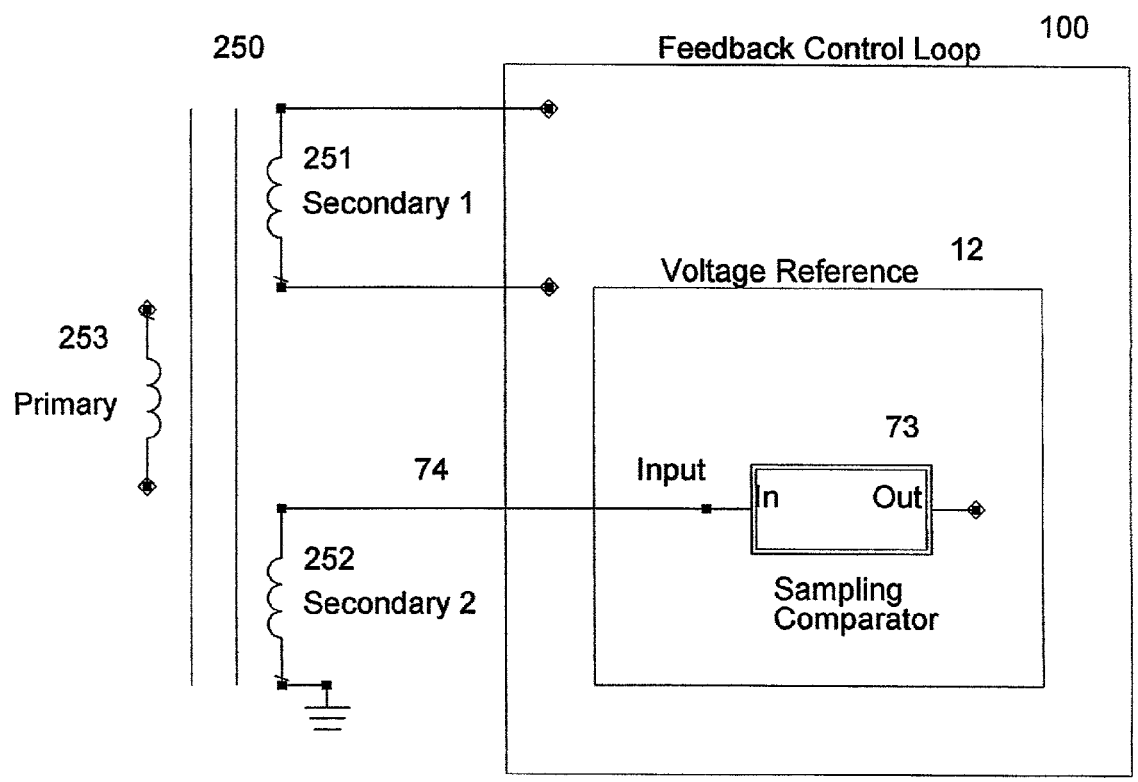
FIG. 12 illustrates an embodiment of a voltage reference circuit including voltage sampling means.

The sampling comparator receives an AC voltage from the incoming AC power source. One possible configuration for AC sampling is shown in FIG. 12, where the AC voltage is sampled from a secondary winding 252 of the isolation transformer 250 of the power conditioner. Shown as secondary 252 in the figure, the AC voltage could be sampled from any convenient secondary tap of the transformer.

Figure 13:
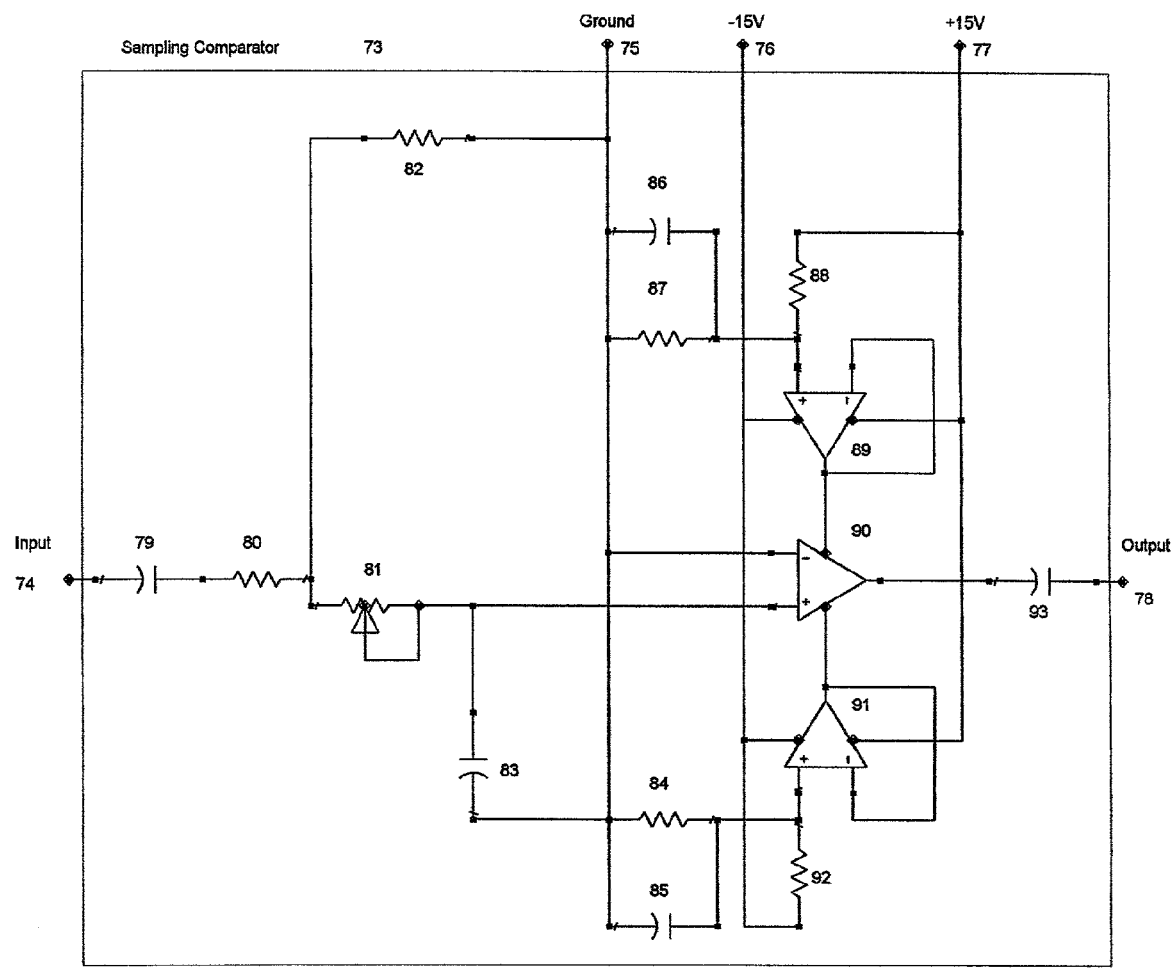
FIG. 13 shows a sampling comparator of a preferred embodiment.

Referring to FIG. 13, the sampled AC voltage at the Input 74 of the sampling comparator 73 is AC coupled through capacitor 79 to a voltage divider consisting of resistors 80 and 82. An adjustable phase lag circuit comprised of resistor 81 and capacitor 83 provide phase optimization of the feedback control loop. The signal is then coupled to the non-inverting input of a high gain rail-to-rail OpAmp 90, which is an OpAmp capable of generating an output voltage anywhere within the range of its power supply voltages. The signal emerges from OpAmp 90 as a squarewave of amplitude determined by the rail voltages presented to OpAmp 90. Over 95% of the random noise power content on the incoming AC power sampled by this circuit is stripped off by OpAmp 90, and is replaced by the well defined harmonic structure of a squarewave. This approach is an improvement to prior art filtering techniques which simply low pass filter the AC signal using linear filtering technology.

The positive rail voltage for OpAmp 90 is provided by OpAmp 89, which is configured to operate as a voltage buffer. A +15V supply voltage is divided down to about 2.7V by resistors 88 and 87. Capacitor 86 provides noise filtration of the +2.7V input to OpAmp 89. In a similar manner, the negative voltage rail to OpAmp 90 is provided by OpAmp 91, resistors 92 and 84, and capacitor 85. The output from OpAmp 90 is AC coupled to the output port 78 of the comparator through capacitor 93.

Figure 14:
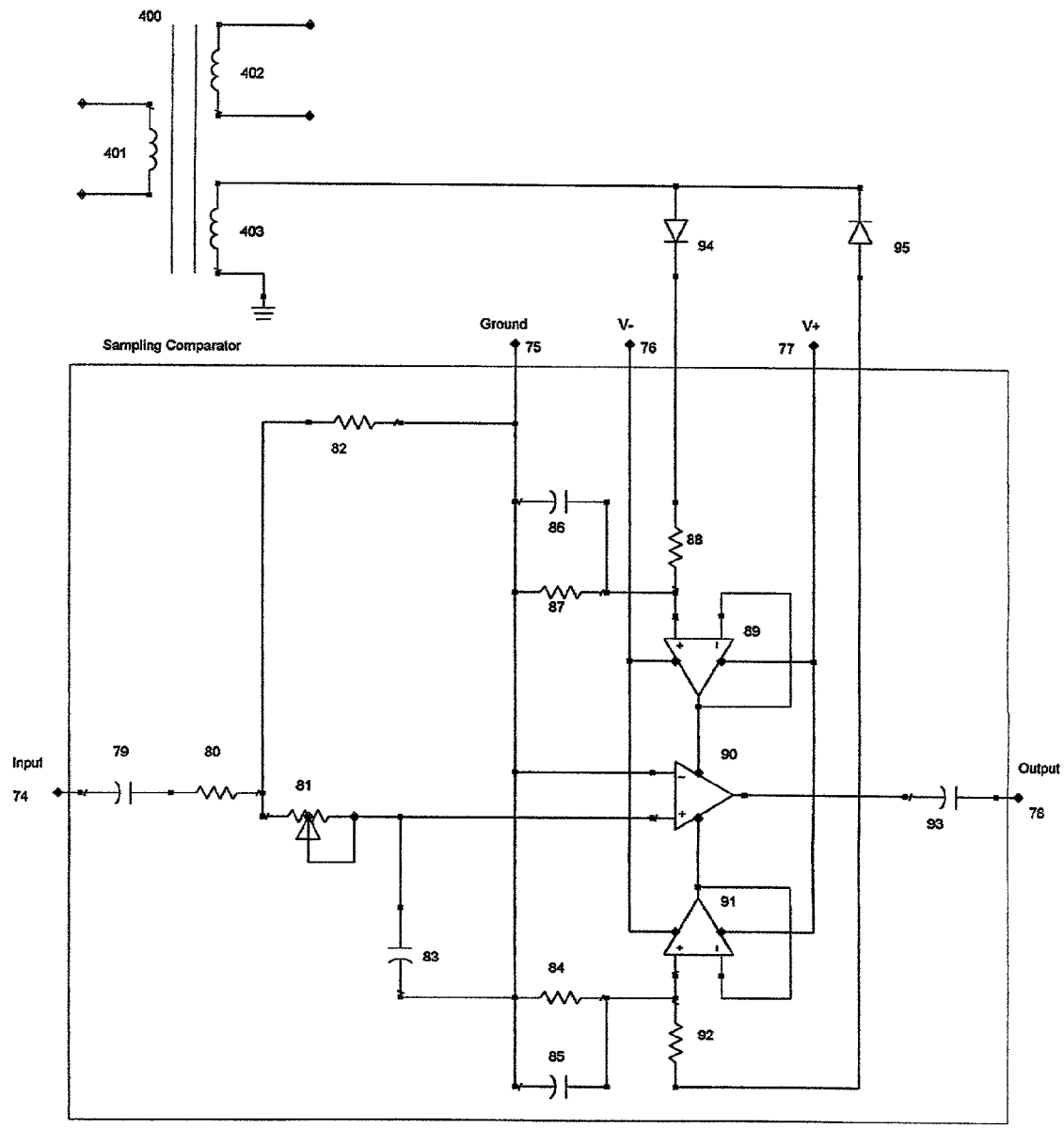
FIG. 14 shows an embodiment of an alternative comparator.

FIG. 14 shows an alternate configuration of the sampling comparator. In this configuration the voltage rails for OpAmp 90 are allowed to track the long term average value of the incoming peak AC voltage. In this case long term average means an average taken over ten to several hundred cycles. This causes the reference voltage and the output voltage of the power conditioner to track the average incoming AC voltage. Short term (less than one period) transient errors in supply voltage do not appear at the operating rails of OpAmp 90, due to the filtering capacitors 86 and 85. The time constant of capacitor 86 with resistors 87 and 88 is chosen to be long enough to prevent transient activity and noise on the incoming power from passing through OpAmp 89. The time constant is also chosen short enough to allow the output of OpAmp 89 to track the long term average voltage of the incoming power. The time constant is preferably in the range of 1–10 seconds. OpAmp 91 and its components operate in a similar manner. As a consequence, the operating voltage rails for the amplifier are allowed to be reduced to the minimum values consistent with the expected maximum short term voltage error of the incoming AC power. No further voltage headroom need be allowed for average voltage line regulation. This kind of regulation may be referred to as transient line regulation, as only transient errors in supply voltage are corrected. The benefit of this practice is significantly improved efficiency, on the order of 85%, due to the lower magnitude voltage rails on the amplifier.

Figure 15:
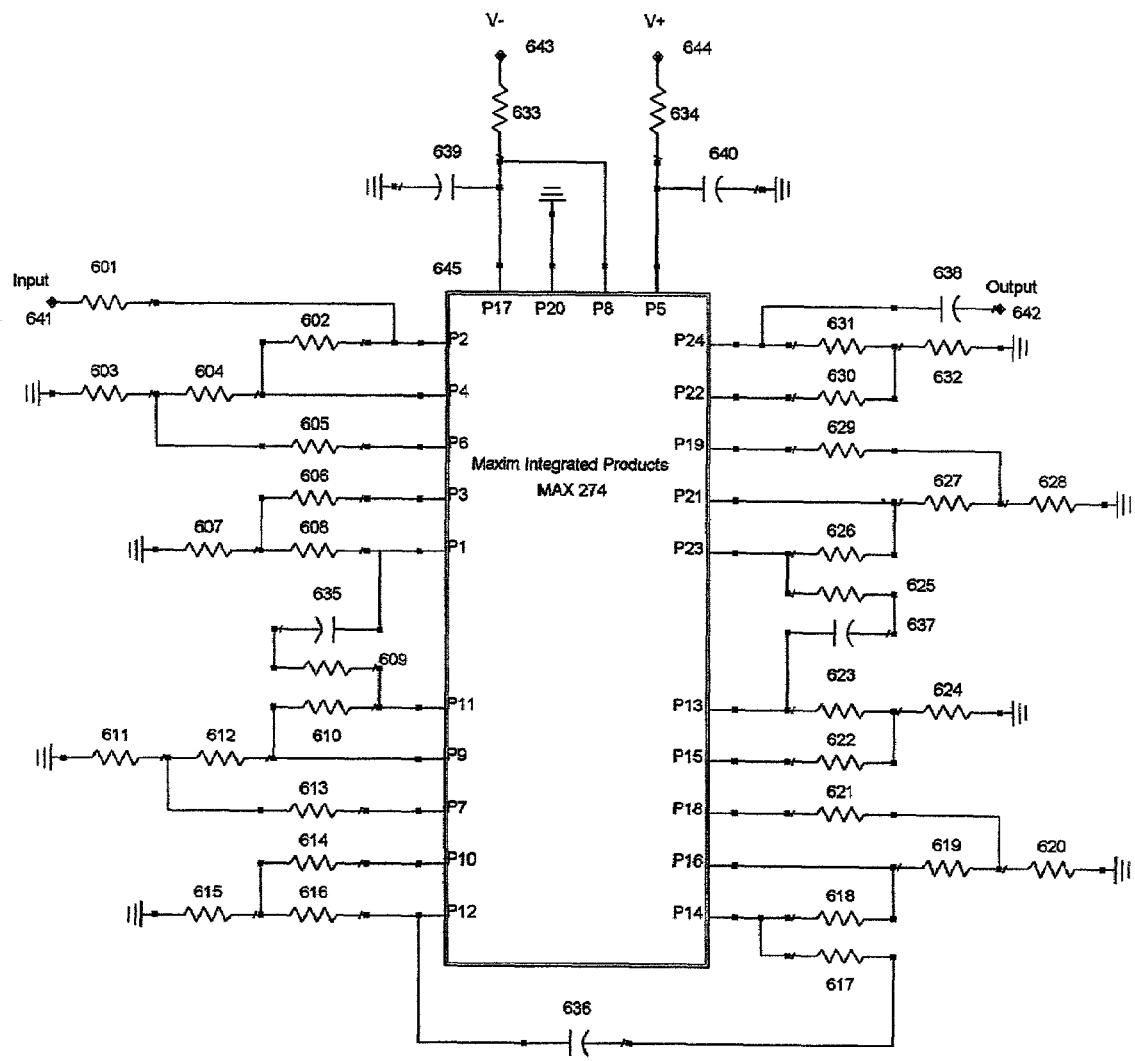
FIG. 15 shows an active low pass filter according to a preferred embodiment.

FIG. 15 shows the configuration of a standard continuous time filter integrated circuit to form the 8th order butterworth low pass filter of the present invention. This is merely an example of the type of filter that could be used. The IC of the preferred embodiment is a MAX274 produced by Maxim Integrated Products. This IC is divided into four identical sections, each one of which is configured by the associated external resisters to form independent sections of the butterworth filter. Section 1 is programmed by resisters 601–608. Section 2 is programmed by resisters 609–616. Section 3 is programmed by resisters 617–624. Section 4 is programmed by resisters 625–632. Capacitors 635–638 AC couple the various sections together so as to prevent any DC offsets generated by the filter sections from accumulating. The filter IC is biased from +5V and −5V supplies through RC low pass filter networks comprised of resister 634 and capacitor 640, and resistor 633 and capacitor 639, respectively.

Numerous other filter structures common to the art are possible substitutions for the filter described in FIG. 15, including passive filters. Any filter type that provides at least 20 dB of suppression of the third and higher harmonics relative to the fundamental frequency of the incoming AC is a useful substitution for the filter described in FIG. 15.

Figure 16:
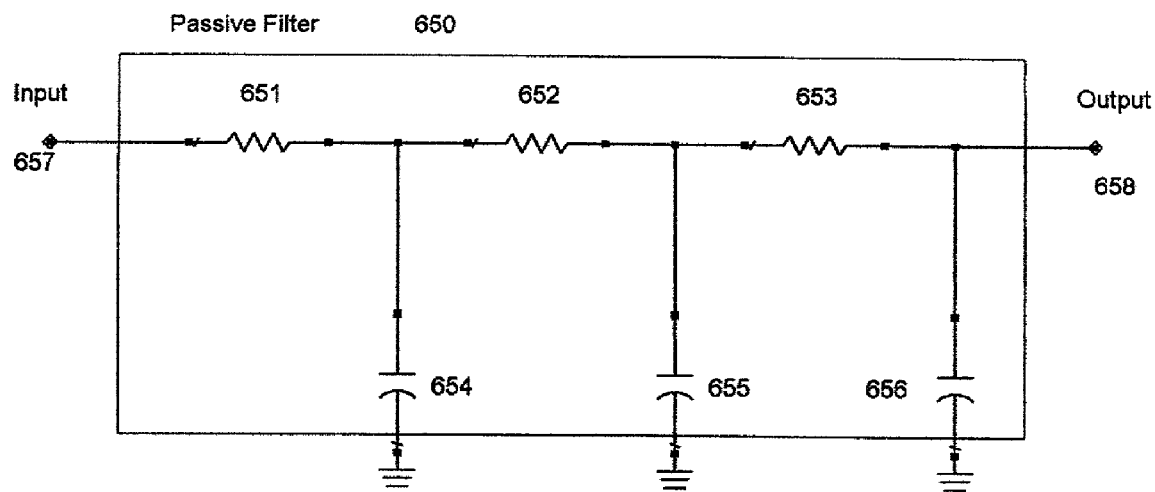
FIG. 16 depicts an embodiment of a passive filter used in a preferred embodiment.

FIG. 16 illustrates an embodiment of the passive filter of the present invention. It is a three section filter composed of RC sections. A first section is comprised of resister 651 and capacitor 654. A second section is comprised of resister 652 and capacitor 655. A third section is comprised of resister 653 and capacitor 656. Each section forms a 6 dB per octave low pass filter. The pole frequency of each low pass section is chosen to be between 10 and 1000 times the frequency of the incoming AC power. The main purpose of this filter is to suppress any noise generated by the active filters that precede it.

Figure 17:
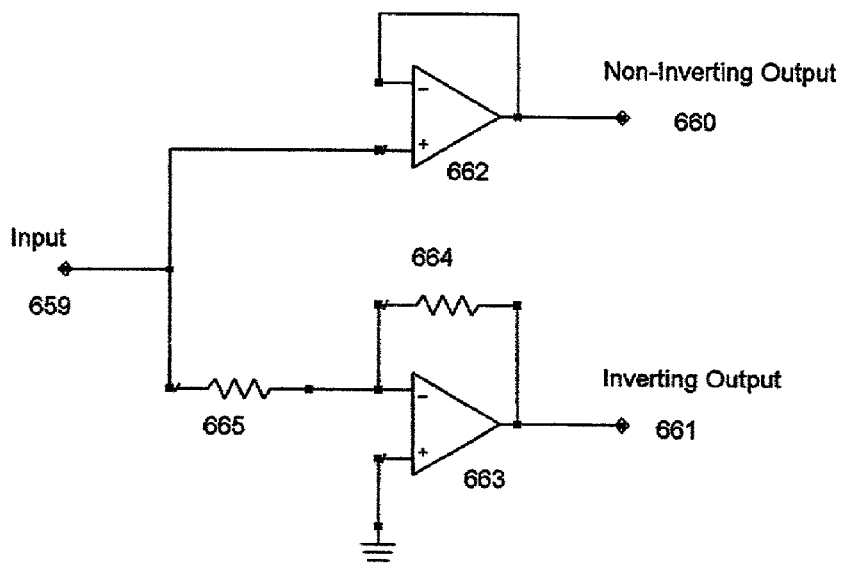
FIG. 17 illustrates an embodiment of a phase splitter used in a preferred embodiment.

FIG. 17 depicts an embodiment of the phase splitter of the preferred embodiment of the present invention. The phase splitter is composed of a pair of OpAmps. OpAmp 662 is wired with its output directly connected to its inverting input. The non-inverting input serves as the input of the resultant non-inverting unity gain buffer. OpAmp 663 is wired with a first resister 664 of value R connected between its output and its inverting input. The non-inverting input is grounded. A second resister 665, also of value R, is connected between the inverting input of OpAmp 663 and the non-inverting input of OpAmp 662. OpAmp 663 operates as an inverting unity gain buffer. The entire circuit operates as a phase splitter, where the non-inverting input of OpAmp 662 is the input of the phase splitter and the output of OpAmp 660 and OpAmp 661 serve as the non-inverting output and the inverting output, respectively.

Figure 18:
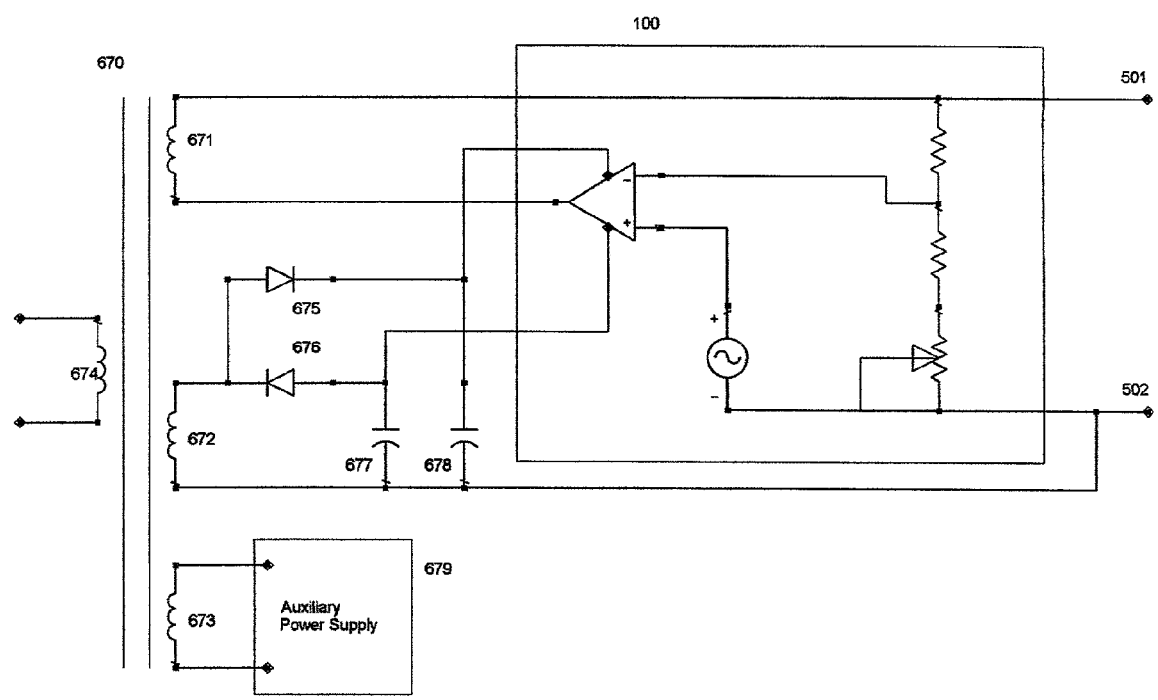
FIG. 18 shows an embodiment of the present invention wherein amplifier supply voltage and auxiliary supply voltage are generated by the isolation transformer.

FIG. 18 shows a power conditioner for unbalanced output power. Transformer 670 provides secondary voltage from secondary winding 671 to operate in conjunction with feedback control loop 100 to provide unbalanced output voltage at output 501 with respect to the output voltage at output 502. In addition, transformer 670 provides the power for the amplifier of feedback control loop 100 from secondary winding 672. Diodes 675 and 676, along with capacitors 677 and 678, perform the rectification of voltage from secondary winding 672, whereby the voltage for the amplifier voltage rails is provided. Auxiliary power for the voltage reference circuitry is provided by an auxiliary power supply 679 and by secondary winding 673.

Figure 19:
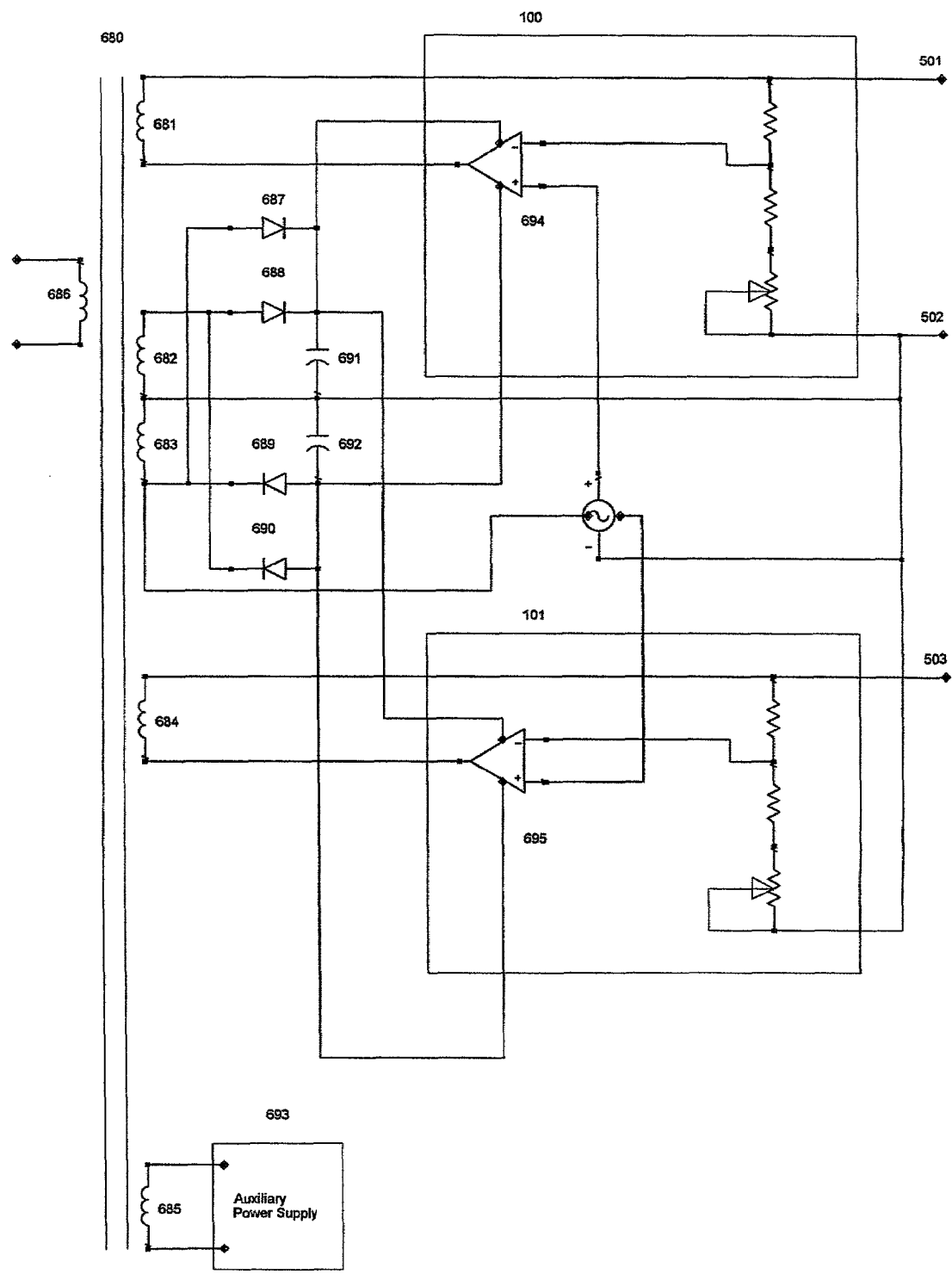
FIG. 19 shows another embodiment of the present invention wherein amplifier supply voltage and auxiliary supply voltage are generated by the isolation transformer.

FIG. 19 depicts a balanced power preferred embodiment of the present invention, in which secondary winding 681 provides power to feedback control loop 100 to produce an output voltage at output 501, while secondary winding 684 provides power to feedback control loop 101 to produce an output voltage at output 503, 180 degrees out of phase from the voltage at output 501. The feedback control loops are tied together at output 502, which forms the ground terminal of the balanced power output. Amplifiers 694 and 695 are powered by a balanced power supply consisting of center tapped secondary winding 682 and 683, a full wave rectifier formed by diodes 687-690, and filter capacitors 691 and 692. The center tap is tied to output ground 502.

An advantage of this embodiment of the system is to provide balanced power from a balanced or unbalanced power line.

Several improvements and enhancements to the embodiments described above will result in improved stability of the feedback control loop and improved tolerance to a wide variety of load impedances and corresponding power factors. Some of these are described below.

Figure 20:
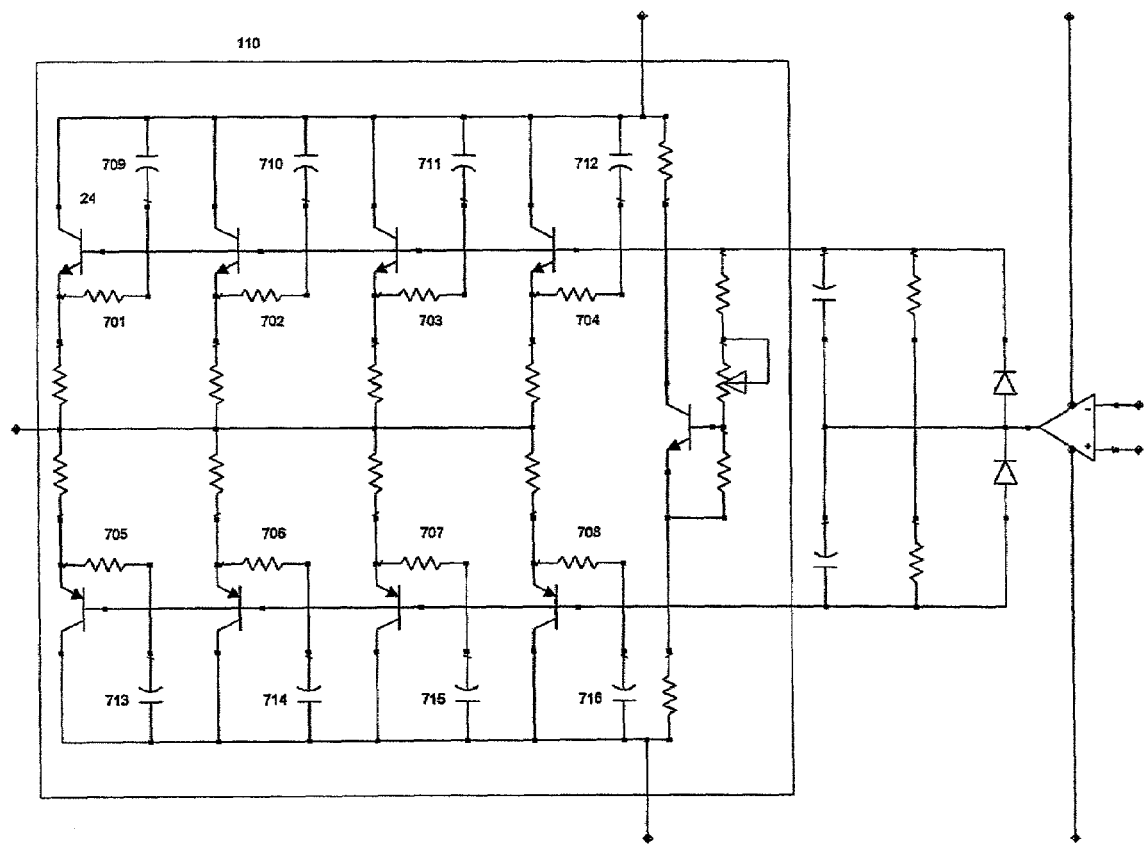
FIG. 20 shows an embodiment of a first R-C network and its implementation for the purpose of stabilizing the feedback control loop.

FIG. 20 shows the output stage 110 of the amplifier as consisting of a plurality of series R-C networks tied across the emitter and collector terminals of the output transistors. Resistor 701 is in series with capacitor 709 to form a series network that is connected across output transistor 24 from emitter to collector. In a similar fashion, a series R-C network appears across each of the output transistor. This technique is useful in stabilizing the servo without compromising operating bandwidth. Typical operating bandwidth is about 100 KHz.

Figure 21:
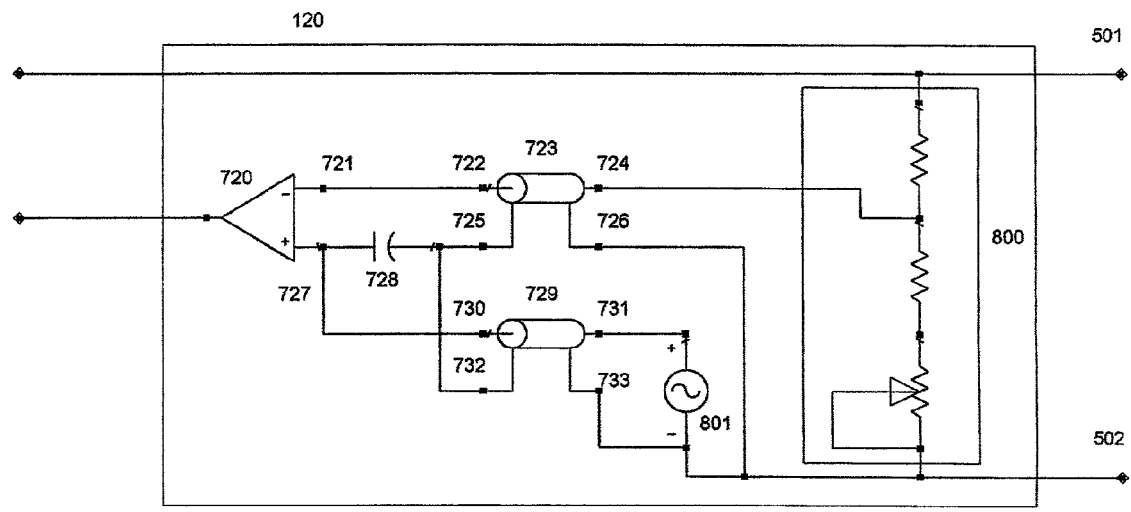
FIG. 21 shows an embodiment of a second R-C network and its implementation for the purpose of stabilizing the feedback control loop.

FIG. 21 shows a method of connecting the sampler 800 and the voltage reference 801 to the amplifier 720 of the feedback control loop 120, in which the sampler 800 feeds terminal 724 of coaxial transmission line 723, the corresponding shield connection 726 is made to node 502. Terminal 722 of transmission line 723 feeds the inverting input 721 of amplifier 720. The voltage reference 801 feeds terminal 731 of coaxial transmission line 729, the corresponding shield connection 733 is made to node 502. Terminal 730 of transmission line 729 feeds the non-inverting input 727 of amplifier 720. The shield terminal 732 of transmission line 729 is connected to the shield terminal 725 of transmission line 723. Both terminals 725 and 732 are connected to amplifier input 727 through capacitor 728. This arrangement is found to preserve the high frequency stability of the feedback control loop and to reject noise that may otherwise enter the system through finite line lengths connecting the sampler 800 and the voltage reference 801 to the amplifier 720.

Figure 22:
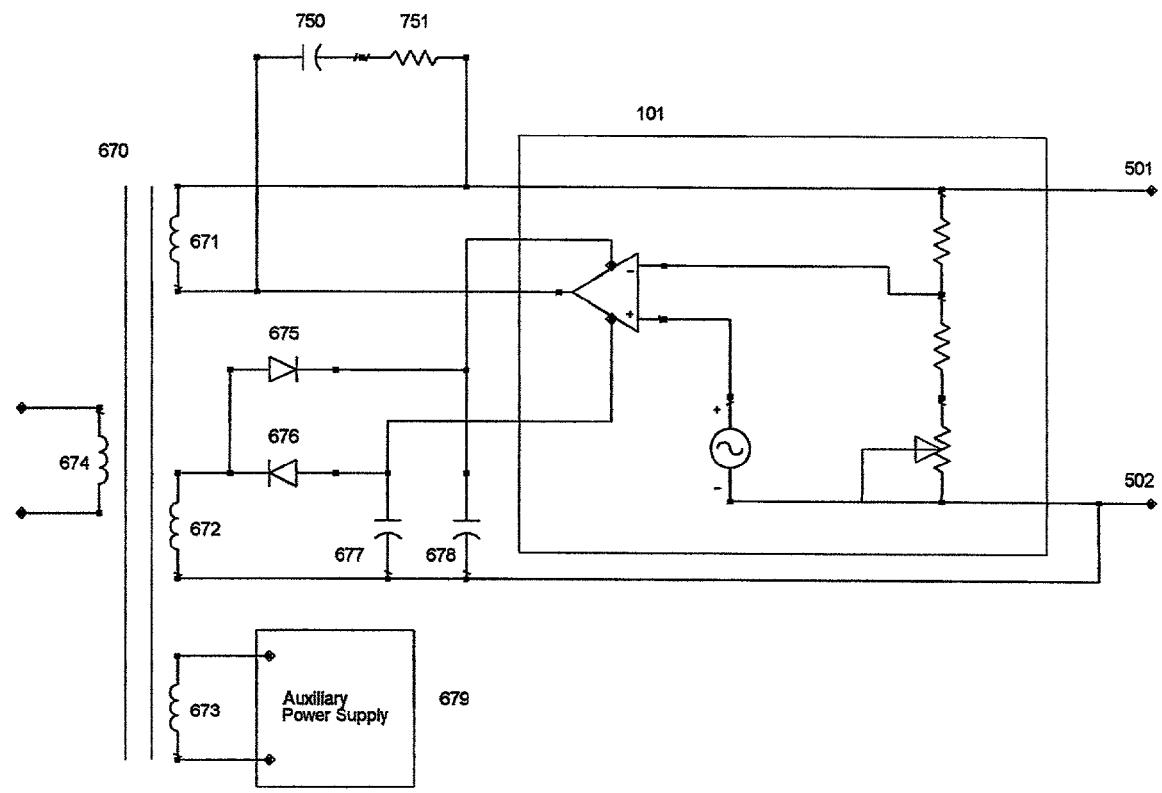
FIG. 22 shows an embodiment of a third R-C network and its implementation for the purpose of stabilizing the feedback control loop.

FIG. 22 shows an embodiment of a series R-C network formed by capacitor 750 and resistor 751; the network thus formed is connected across the secondary winding 671 of isolation transformer 670. The series R-C network is useful in stabilizing the feedback control loop 101 over a broad frequency range.

Figure 23:
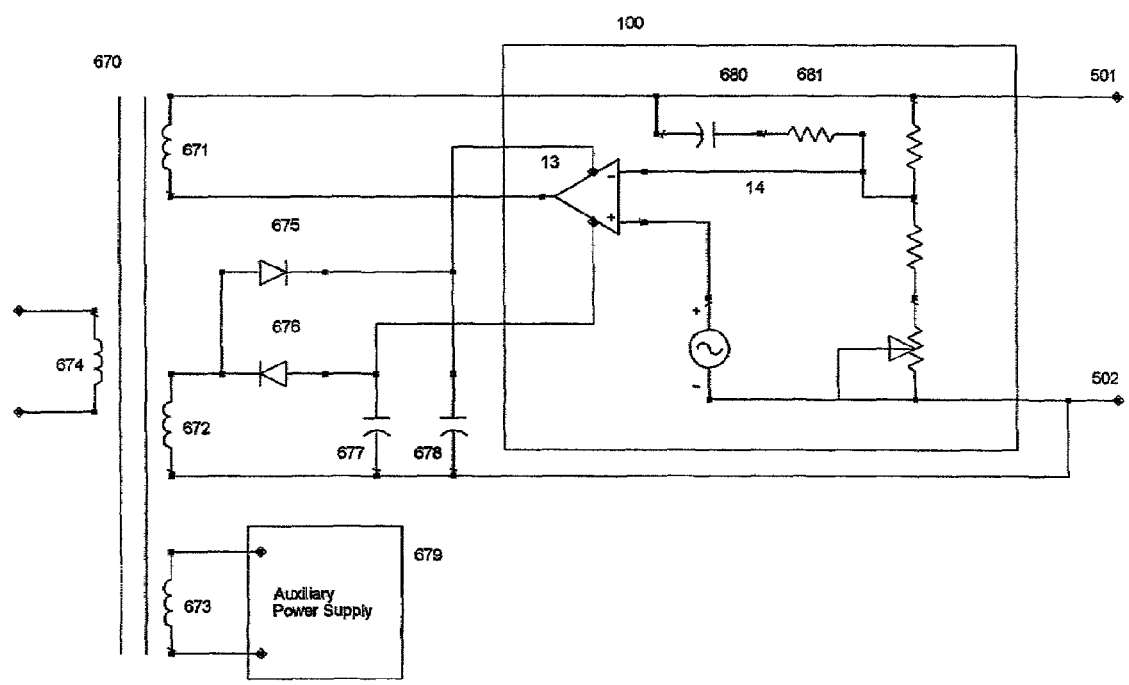
FIG. 23 shows an embodiment of a fourth R-C network and its implementation for the purpose of stabilizing the feedback control loop.

FIG. 23 illustrates an embodiment of a series R-C network formed by resistor 681 and capacitor 680, the series network connected between the output terminal 501 of the power conditioner and the inverting input 14 of the amplifier 13 so as to promote stability of the feedback control loop 100.

Figure 24:
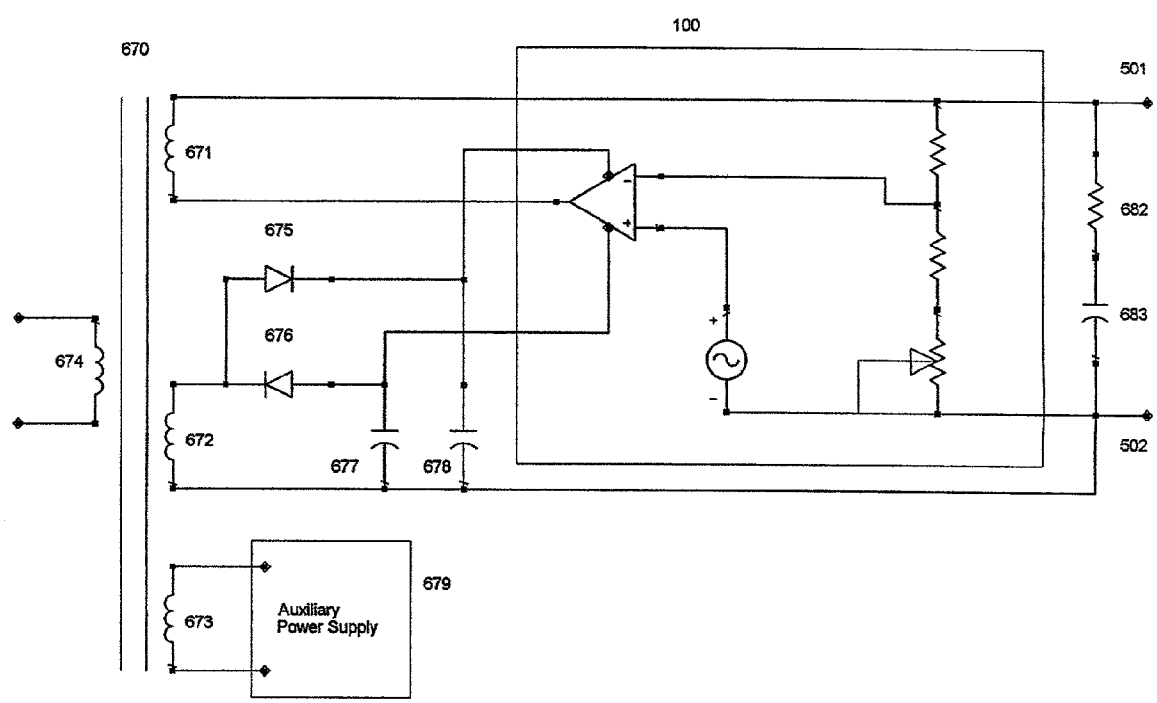
FIG. 24 shows an embodiment of a fifth R-C network and its implementation for the purpose of stabilizing the feedback control loop.

FIG. 24 shows an embodiment of a series R-C network formed by resistor 682 and capacitor 683, the series network connected across the output of the power conditioner between output terminals 501 and 502 so as to stabilize the feedback control loop to a variety of load impedances.

There are no doubt several alternative embodiments that result in a power conditioner operating in accordance with the descriptions presented herein. Those skilled in the art will appreciate that such alternatives do not obscure the intent of the present invention, nor do they transcend the spirit of the invention hereby disclosed.

What is claimed is:

1. A series active power line conditioner, comprising:
   an isolation transformer having a primary winding and a first secondary winding, said primary winding for receiving power from a source of alternating current power; and
   a feedback control loop comprised of a voltage reference, an output sampler, and an amplifier, said output sampler functioning to provide a scaled sampling of the output voltage of said power line conditioner to a first input of said amplifier, said voltage reference connected to provide a desired voltage to a second input of said amplifier; an output of said amplifier connected to a first terminal of said first secondary winding of said isolation transformer, and a second terminal of said first secondary winding of said isolation transformer connected to an input of said output sampler, said second terminal of said first secondary winding of said isolation transformer also constituting the output of said power line conditioner.

2. The power line conditioner of claim 1 wherein the terminals of said primary winding of said isolation transformer are connected to a first port of the power line conditioner, said first port also in communication with an AC power source; and
   said second terminal of said first secondary winding of said isolation transformer wired to a second port of the power line conditioner, said second port adapted for connecting one or more loads to said second port of the power line conditioner.

3. The power line conditioner of claim 2 wherein said isolation transformer has a second secondary winding having current capability equal to that of said first secondary winding, said second secondary winding providing power to said amplifier of said feedback control loop, whereby voltage deficiencies in the incoming AC power are corrected by said amplifier utilizing the additional voltage contributed by said second secondary winding.

4. The power line conditioner of claim 3 wherein said amplifier is a differential amplifier having first and second inputs and an output port, said first input operating as a non-inverting input such that excitations presented to said first input are amplified by said amplifier with substantially zero phase shift, said second input operating as an inverting input such that excitations presented to said second input are amplified by said amplifier with substantially 180 degrees of phase shift; and
   said output sampler wired between said output port of the power line conditioner and said inverting input of said amplifier, said output port of said amplifier wired to said first terminal of said first secondary winding of said isolation transformer, said second terminal of said first secondary winding of said isolation transformer constituting said output of the power line conditioner, the loop formed by said first secondary winding, said output sampler, and said amplifier operating to provide said amplifier with substantially negative feedback.

5. The power line conditioner of claim 4 wherein said output sampler comprises a voltage divider network.

6. The power line conditioner of claim 5 wherein said voltage reference is derived from a sampling of the incoming AC power and is substantially purified of harmonic, spurious, and random noise by a filter.

7. The power line conditioner of claim 5 wherein a passive network comprised of at least one capacitor is connected in parallel with said first secondary winding of said isolation transformer.

8. The power line conditioner of claim 7 wherein said passive network is comprised of a series connected resister and capacitor.

9. The power line conditioner of claim 4 wherein said output sampler is comprised of at least one resister and at least one capacitor, the gain of said output sampler being frequency dependent according to a time constant associated with said resister and said capacitor, the gain of said output sampler being measurably higher above than below a corner frequency associated with said time constant.

10. The power line conditioner of claim 9 wherein said output sampler contains a network comprised of a series connected resister and capacitor, said network connected between the input and the output of said output sampler.

11. The power line conditioner of claim 4 wherein a third input port is formed at a first terminal of a capacitor, a second terminal of said capacitor being connected to said non inverting input of said differential amplifier, said third input port being connected to the shield of at least one shielded cable by which connection is made between said differential amplifier and other components of said feedback control loop.

12. The power line conditioner of claim 4 wherein said differential amplifier is comprised of a integrated circuit operational amplifier and a high current push pull output stage, the output of said integrated circuit operational amplifier being coupled to the input of said push pull output stage so as to form a differential amplifier of higher output current capability compared to the current capability of the integrated circuit operational amplifier.

13. The power line conditioner of claim 12 wherein a passive network comprised of at least one capacitor is connected to an output terminal of an active device used to perform amplification in said output stage and a terminal of a power supply used to bias said active device.

14. The power line conditioner of claim 13 wherein said passive network is comprised of a series connected resister and capacitor.

15. The power line conditioner of claim 12 wherein at least one diode is wired between the output of said integrated circuit operational amplifier and the input of said output stage, the polarity of said diode determined so as to permit the passage of output current from the output of said operational amplifier to the input of said output stage, the same polarity also providing blockage to current associated with the quiescent bias conditions of active devices used within said output stage to perform amplification.

16. The power line conditioner of claim 6 wherein said filter utilizes a voltage comparator for compressing a sampling of the incoming AC power into a substantially square wave.

17. The power line conditioner of claim 16 wherein a first and second power supply rail of said comparator is derived from the output of a first and second operational amplifier, respectively, the outputs of said operational amplifiers being wired to their respective inverting inputs so as to provide a voltage follower function in each of said operational amplifiers.

18. The power line conditioner of claim 16 wherein said voltage comparator operates from rail voltage supplies that are derived from a sampling of the incoming AC power in such a way that said rail voltage supplies effectively track the amplitude of the incoming AC power, the end result of which is a voltage comparator whose square wave output tracks the average amplitude of the incoming AC power.

19. The power line conditioner of claim 6 wherein said filter includes at least one operational amplifier configured to operate as a low pass filter.

20. The power line conditioner of claim 6 wherein said filter includes at least one 8th order low pass active filter.

21. The power line conditioner of claim 6 wherein said filter includes at least one passive resister-capacitor low pass filter.

22. The power line conditioner of claim 6 wherein said isolation transformer includes third and fourth secondary windings, said third secondary winding having substantially identical number of turns as said first secondary winding, said fourth secondary winding having substantially identical number of turns as said second secondary winding, wherein also, said feedback control loop appears in duplicate as first and second feedback control loops, said first loop connected to said first and second secondary windings of said isolation transformer to form a first half of a balanced output power line conditioner, said second loop connected to said third and fourth secondary windings of said isolation transformer to form a second half of said balanced output power line conditioner, said third and fourth secondary windings of said isolation transformer connected to said second half of said balanced output power line conditioner in opposite phase with respect to said first half of said balanced output power line conditioner, said first half and said second half operating together to provide a balanced output voltage with respect to a common ground connection between said first half and said second half, without respect to the balanced or unbalanced nature of the circuit associated with said primary winding of said isolation transformer.

23. The power line conditioner of claim 22 wherein said voltage reference includes a phase splitter functioning to provide antiphase outputs from said voltage reference, said phase splitter being comprised of a first operational amplifier wired as a conventional non-inverting amplifier, and a second operational amplifier wired as a conventional inverting amplifier.

24. The power line conditioner of claim 22 wherein a first passive network including at least one capacitor is wired between a first output of said balanced output power line conditioner and said common ground, and a second passive network including at least one capacitor is wired between a second output of said balanced output power line conditioner and said common ground.

25. The power line conditioner of claim 24, wherein said first and second passive networks include at least one series connected resister and capacitor.

* * * * *